Jan. 13, 1959  L. FORTIER  2,868,399
LOADING ATTACHMENT FOR TRACTORS
Filed Sept. 9, 1957  3 Sheets-Sheet 1
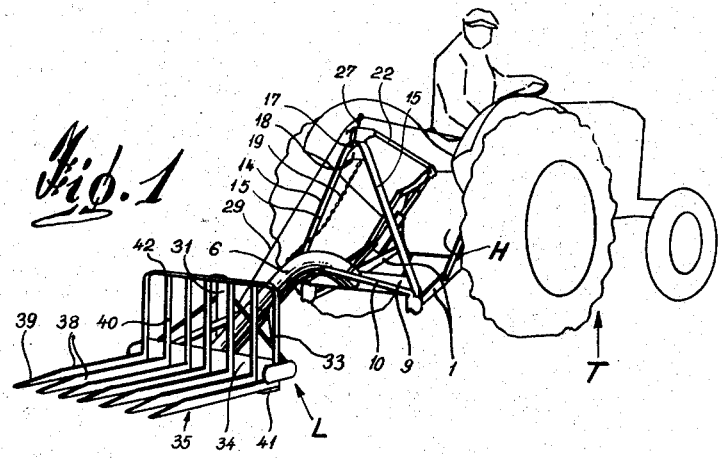
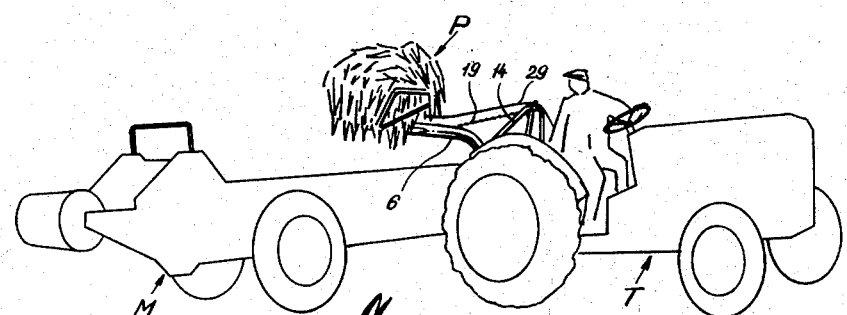
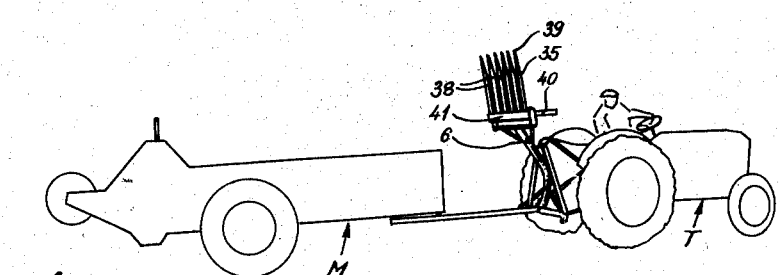
INVENTOR
L. FORTIER
BY Robic Bastien
ATTORNEYS Jan. 13, 1959 L. FORTIER 2,868,399
LOADING ATTACHMENT FOR TRACTORS
Filed Sept. 9, 1957 3 Sheets-Sheet 2
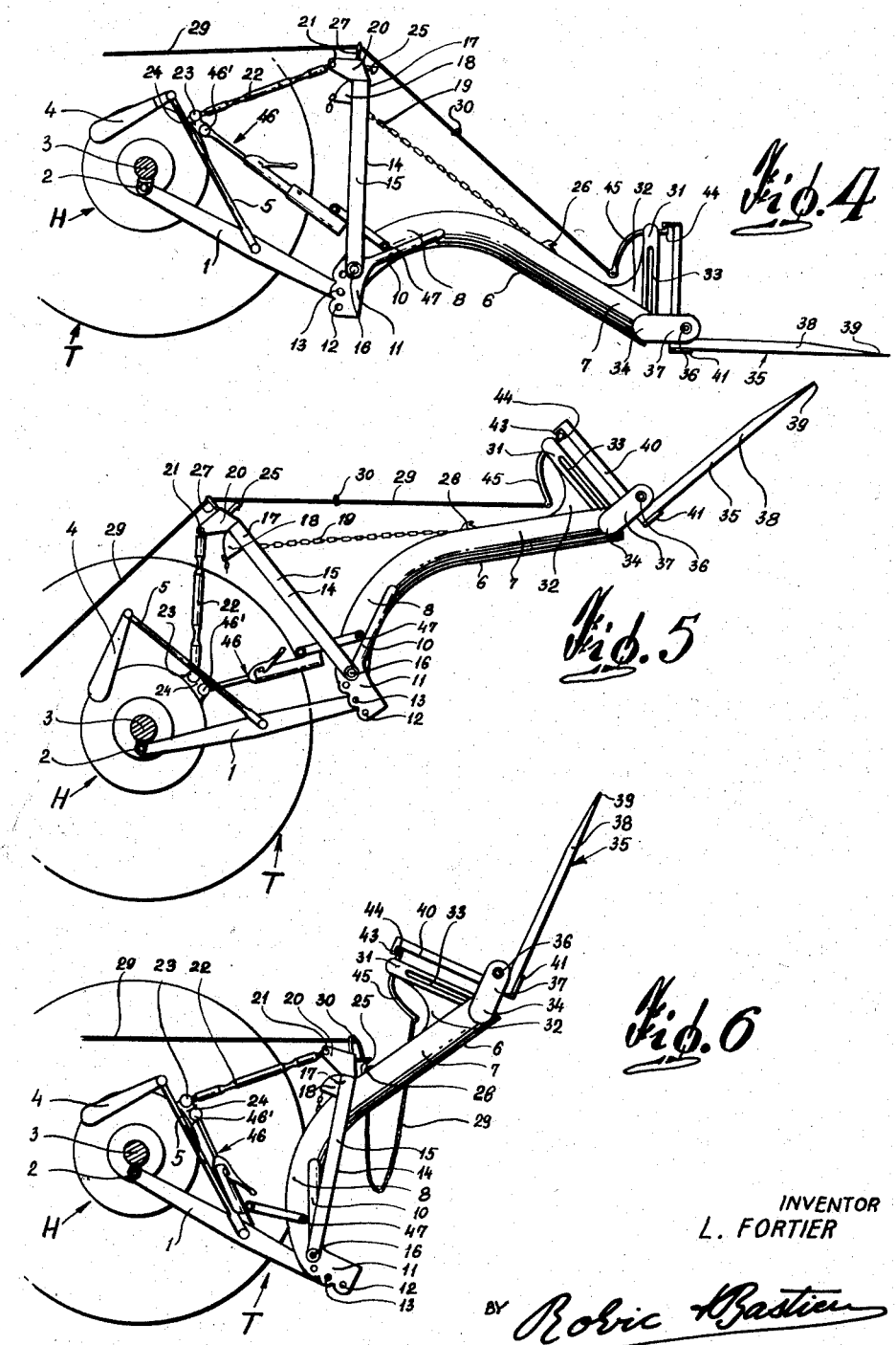
INVENTOR
L. FORTIER
BY Robic Bastien
ATTORNEYS

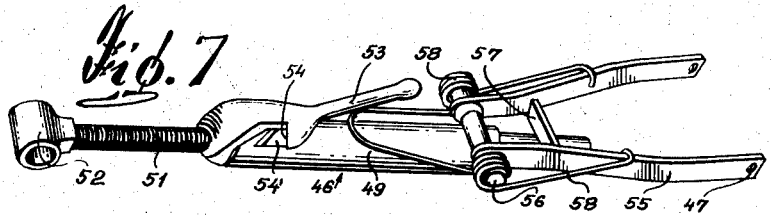
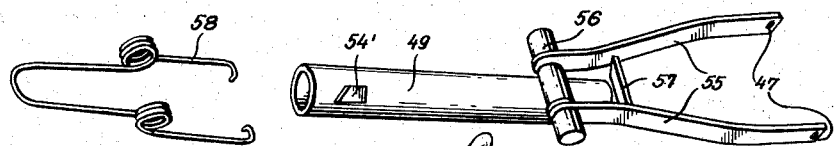
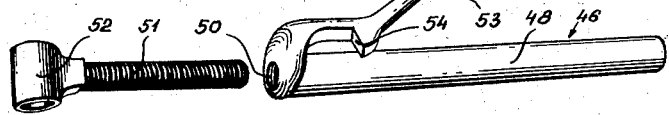
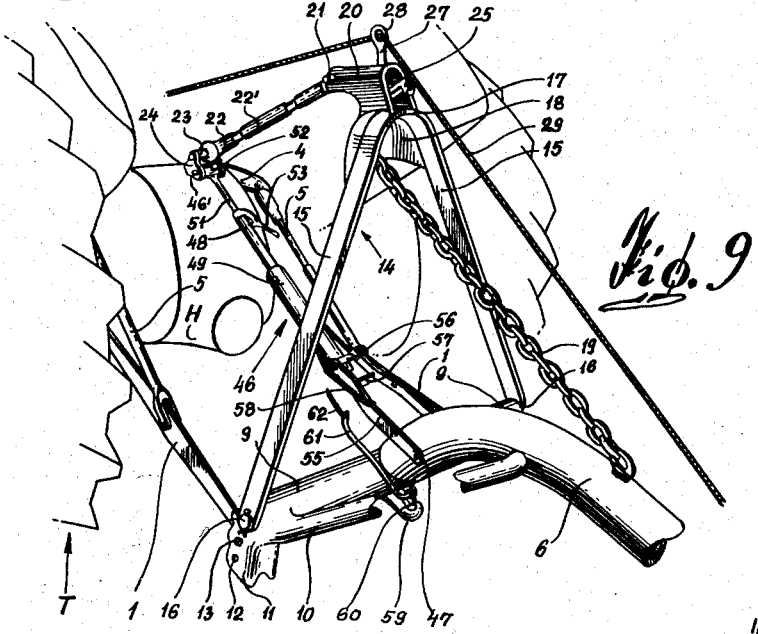

United States Patent Office 2,868,399
Patented Jan. 13, 1959

2,868,399

LOADING ATTACHMENT FOR TRACTORS

Laurent Fortier, St. Clothilde, Quebec, Canada

Application September 9, 1957, Serial No. 682,666

13 Claims. (Cl. 214—140)

The present invention relates to a loading device, and, more particularly, to a loading attachment for tractors especially designed for loading manure into manure spreaders but which can also be modified for loading other types of material.

The loader, in accordance with the present invention, is adapted to be used in combination with a farm tractor provided with a conventional lifting mechanism at the back thereof.

Conventional manure loaders are adapted to be fitted at the back of a farm tractor and are operated by the conventional lifting mechanism of the tractor. But the conventional loaders are not capable of being raised to an out-of-the-way position to allow hitching of a manure spreader or other vehicle. Therefore, to spread the manure on the field, which involves alternative loading of the spreader and pulling of the spreader over the fields to spread the manure, either two tractors are needed, one fitted with the conventional manure loader and the other hooked to the manure spreader, or, if only one tractor is used, the manure loader has to be detached from said tractor each time it is required to pull the manure spreader.

The general object of the present invention is the provision of a loader of the character described which is power actuated by the lifting mechanism of the tractor between a lowered and an elevated position for loading operation and which is also provided with means for automatically raising the loader into an upright, inoperative position upon actuation of said lifting mechanism, whereby the loader clears the back of the tractor so that a vehicle, such as a manure spreader, may be hitched to and pulled by the tractor without having to dismount the loader.

Still another important object of the present invention is the provision of a loading attachment of the character described which can be operated entirely from the driver's seat of the tractor.

Still another important object of the present invention is the provision of a loading device of the character described which is of rugged and relatively inexpensive construction and which can be fitted to existing farm tractors provided with a conventional lifting mechanism.

The foregoing and other important objects of the present invention will become more apparent during the following disclosure and by referring to the drawings in which:

Figure 1 is a perspective view of the loading attachment in the lowered position thereof and shown attached at the back of a conventional tractor provided with a lifting mechanism;

Figure 2 is a perspective view of the loading device in raised loading position about to discharge a load of manure into a manure spreader;

Figure 3 is a perspective view showing the tractor pulling the manure spreader and showing the loading device in upright inoperative position;

Figure 4 is a side elevation of the loading device in lowered position shown attached to the conventional lifting mechanism of the tractor;

Figure 5 is a view similar to that of Figure 4, showing the loader in elevated loading position with the tension device locked in retracted position in preparation for pivoting the loader into inoperative upright position;

Figure 6 is a view similar to that of Figure 5, showing the loader in inoperative upright position;

Figure 7 is a perspective view of the assembled tension device;

Figure 8 is an exploded perspective view of the various elements composing the tension device; and Figure 9 is a partial perspective view of the loader mechanism.

Referring now more particularly to the drawings in which like reference characters indicate like elements throughout, the manure loader is generally indicated at L, and is mounted at the back of a conventional farm tractor T which is provided with a conventional lifting mechanism. Said lifting mechanism comprises a pair of lifting levers 1 which have their forward end pivotally mounted at 2 on the differential housing H of the tractor and underneath the tractor driving shaft 3. The lifting levers 1 extend rearwardly laterally of the housing H and are raised or lowered by means of the power arms 4 and connecting rods 5.

The loader L, in accordance with the present invention, is fitted to the lifting levers 1 of the conventional lifting mechanism and all the movements of said loader L are produced by said lifting mechanism.

The loader L comprises a tubular main arm 6 having a straight rearward portion 7 and a curved front portion 8. The end of the curved portion 8 is welded or otherwise rigidly secured to a transverse tubular leg 9. Diagonal braces 10 rigidly connect the outer ends of the transverse leg 9 to the main arm 6. Downward flanges 11 depend from the outer ends of the transverse leg 9 and are each provided with a series of vertically spaced pivot holes 12 for adjustably pivotally connecting the loader to the outer ends of the lifting levers 1 of the conventional lifting mechanism.

In the drawings, the outer ends of the lifting levers 1 are pivotally connected at 13 to the flanges 11 by means of the intermediate holes 12. A stirrup member 14, in the form of an inverted V-shaped member, is disposed over the transverse leg 9 and has the outer ends of its two straight legs 15 pivotally connected at 16 to the flanges 11. The apex portion 17 of the stirrup 14 is provided with a web 18 which has a keyhole (not shown) for removably receiving a chain 19 and adjustably securing said chain to said stirrup member 14 by engaging any one of the links of the chain into the restricted portion of the keyhole. The forward end of the chain 19 is welded or otherwise attached to an intermediate portion of the main arm 6. The main arm 6 normally tends to rotate downwardly, with respect to the stirrup member 14, under its own weight and the chain 19 is a collapsible tension member which serves to limit said downward rotational movement of the arm 6 to thereby adjustably vary the angular limit position of the arm 6 with respect to the stirrup 14.

The apex portion 17 of the stirrup 14 is further provided with a welded top member 20 made from an inverted U-shaped plate and providing a pivotal connection 21 at the rear end thereof for a link 22 which is pivotally connected at its forward end 23 to a bracket 24 rigidly secured on top and in the middle of the tractor housing H. The link 22 has a turn buckle 22' for adjusting its length.

The top member 20 also mounts a latching member 25 which is pivotally mounted therein and is adapted to engage a hooking block 26 welded or otherwise secured on top of the main arm 6 rearwardly of the attachment of the chain 19 to said arm 6. The latching member 25 is provided with an actuating arm 27 passing through a slot made in the top member 20 and provided with an eye 28 through which a rope 29 is threaded. The forward end of the rope 29 is attached near the driver's seat of the tractor so as to be accessible to the driver and is provided with a knot 30 rearwardly of the eye 28 and suitably spaced so that on pulling the rope 29 the knot 30 will abut against the eye 28 to thereby pivot the latching member 25 to unlatch the main arm 6 from the stirrup 14. The rope 29 also has another action which will described hereinafter.

The outer end of the main arm 6 is provided with a rigid, upwardly directed post 31 which is inclined with respect to the straight portion 7 of the main arm and is reinforced by a web 32. Lateral braces 33 connect the outer ends of a transverse support member 34 to the post 31. The middle portion of the member 34 is welded, or otherwise rigidly secured, to the outer end of the main arm 6. A fork member 35 is pivotally mounted at 36 on end flanges 37 secured to the support member 34. The fork 35 comprises a plurality of prongs 38 having pointed ends 39 and each provided with a right angular extension 40 forming a rest for the manure.

The prongs 38 and their extensions 40 form a rigid frame together with a transverse bar 42.

The bar 42 is provided with a hook 43, as shown in Figures 4, 5 and 6, which is engageable by a latching lever 44 pivoted on the upper end of the post 31 and having a downward extension 45 attached to the rope 29.

In the position of the loader shown in Figure 5, the fork 35 is latched to the post 31 so that a load of manure may be brought over the manure spreader M; upon pulling of the rope 29, the fork 35 is unlatched from the post 31 and pivots about the pivots 36 to thereby discharge the manure P into the spreader M.

The loader, in accordance with the present invention, is further provided with a tension member, generally indicated at 46, which is pivotally connected at 46' to the tractor differential housing H on the bracket 24 near the pivot connection 23 of the link 22 and which has its rearward portion pivotally connected at 47 on the curved portion 8 of the main arm 6.

The tension member 46 is more particularly illustrated in Figures 7 and 8; said tension device comprises an inner tubular member 48 in telescopic engagement with an outer tubular member 49. The inner member 48 has inner threads 50 for receiving a bolt 51 provided with a sleeve 52 for pivotal connection to the bracket 24 at the pivot 46'. The inner tubular member 48 is also provided with a rigid handle 53 having a latching face 54 adapted to engage a block 54' protruding from the outer tubular member 49. A yoke member 55 is pivoted on the outer tubular member 49 on a transverse pin 56. The outer ends of the legs of the yoke 55 are adapted to be pivotally connected to the main arm 6 at 47. The yoke member 55 is provided with a brace 57 adapted to abut against the portion of the inner tubular member 48 protruding from the outer member 49. A spring 58 mounted on the transverse pin 56 and having portions abutting the tubular member 49 and the legs of the yoke-shaped member 55, tends to pivot the latter into a position with the transverse brace 57 abutting against the inner tube 48.

As shown in Figure 9, the tension member 46 is mounted between the tractor housing 8 and the main arm 6 in such a way that the yoke member 55 may pivot upwardly with respect to the outer tube 49.

The loader is further provided with a hitching device to attach the drawbar of the manure spreader M for pulling said spreader by the tractor. The hitching device is shown in Figure 9 and consists of a hook 59 welded or otherwise secured to the tarnsverse leg 9 underneath the main arm 6 and provided with a pivoted locking member 60 which is actuated from the driver's seat of the tractor by means of the lever 61 and rope 62.

The loader in accordance with the present invention is operated as follows:

For normal loading operation, the tension member 46 has no action and its inner tube 48 is in an angular position with respect to the outer tube 49, such that the latching face 54 of the handle 53 is out of engagement with the block 54' on the outer tube 49. Thus, raising and lowering of the conventional lifting mechanism of the tractor moves the fork 35 between a ground level position, as shown in Figure 4, and an upwardly inclined raised position as shown in Figure 5. During this movement the inner tube 48 of the tension member 46 moves freely within the outer tube 49. Also the stirrup member 14 moves as a unit together with the main arm 6, the latter being maintained in a predetermined angular position with respect to the stirrup 14 by means of the chain 19. This unit moves about the pivot points 2 and 23 through the intermediary of the lifting levers 1 and link 22. To unload the manure on the fork 35, the latter is unlatched so as to freely pivot downwardly about the pivots 36 by pulling on the rope 29 which unlatches the lever 44 from the hook 43.

Whenever it is desired to place the loading device in an inoperative upright position, as shown in Figure 6, the device is raised to its operative upwardly inclined position, as shown in Figure 5, in which position the tension member 46 has a retracted position whereby it is possible to lock said tension member in said retracted position by simply turning the handle 53 so that the latching face 54 will engage the block 54'. Upon subsequent lowering of the conventional lifting mechanism, the main arm 6 will pivot upwardly due to the tension exerted by the retracted tension member 46 and will finally take an upright position in which it is locked by the latching member 25 engaging the block 26 on the main arm 6. In Figure 6, the levers 1 have again been slightly raised from their lowermost position, while the main arm is locked in upright position. In said last named movement, the yoke 55 pivots with respect to the outer tube 49 of the tension member 46, to take care of the reduced distance between the pivot points 47 and 46'. When the loader is in upright inoperative position, the drawbar of the manure spreader M can be easily latched onto the hook 59, just underneath the root of the main arm 6: this can be easily effected without the driver having to get down from the tractor, provided the drawbar of the speader M has a support leg to maintain the eye of the drawbar at an appropriate level for proper hitching to the tractor. Whenever it is desired to unhitch the spreader M, the rope 62 is pulled by the operator and the lifting mechanism of the tractor is slightly lowered to disengage the hook 59 from the drawbar of the spreader.

To again use the loader, the rope 29 is pulled by the driver to unlatch the latching member 25 from the block 26 whereby the fork drops into its lowered position ready for the loading operation of the manure spreader M.

It will be noted that the assembly of the lifting levers 1, arm 6, stirrup 14, link 22 and tractor housing H forms an articulate multilateral arrangement and that the tension member 46 is connected substantially diagonally across said arrangement so that the distance between the pivot points 47 and 46' of the tension member 46 will vary depending upon the position of the articulated multilateral arrangement.

The bolt 51, threadedly engaging the inner tube 48 in the tension member 46, serves as an adjustment to adjust the overall length of the tension member.

Although, the tension member 46 described in detail in the present description is preferred, said member could be replaced by other suitable tension devices such as a chain or the like.

While a preferred embodiment according to the present invention has been illustrated and described it is understood that various modifications may be resorted to without departing from the spirit and scope of the appended claims.

I claim:

1. A loading attachment for a tractor having a pair of lifting levers at the back thereof and power means for raising and lowering said lifting levers, said attachment comprising a main arm having a transverse leg at the inner end thereof, the outer ends of said transverse leg being pivotally connected to said pair of lifting levers, a loading device mounted at the outer end of said main arm, an upstanding member pivotally connected to said main arm at its lower end, a link pivotally connected to the upper end of said upstanding member and to said tractor at a point above the points of attachment of said lifting levers to said tractor, a first collapsible tension member between said upstanding member and said main arm and a second tension member between said tractor and said main arm and attached to said main arm at a point intermediate the inner and outer ends of said main arm, said second tension member being freely extensible between a retracted and elongated position and incorporating means for locking said tension member into its retracted position, so constructed and arranged that, when said second tension member is unlocked and is freely extensible, operation of said lifting levers will cause raising and lowering of said main arm and upstanding member between a low and a raised upwardly inclined position for normal loading operation and that, when said second tension member is locked in its retracted position, lowering of said lifting levers will cause said main arm to pivot into an inoperative upright position.

2. A loading attachment for a tractor having a pair of lifting levers at the back thereof and power means for raising and lowering said lifting levers, said attachment comprising a main arm having a transverse leg at the inner end thereof, the outer ends of said transverse leg being adjustably pivotally connected to the outer ends of said lifting levers to adjust the level of said transverse leg with respect to said outer ends of said lifting levers, a loading device mounted at the outer end of said main arm, an upstanding member pivotally connected to said main arm at its lower end, a link pivotally connected to the upper end of said upstanding member and to said tractor at a point above the points of attachment of said lifting levers to said tractor, a first collapsible tension member connected to said upstanding member and to said main arm, and a second tension member connected to said tractor adjacent the point of connection of said link to said tractor, and to said main arm at a point intermediate the inner and outer ends of the latter, said second tension member being freely extensible between a retracted and an elongated position and incorporating means for locking said tension member in its retracted position, so constructed and arranged that, when said second tension member is unlocked and is freely extensible, operation of said lifting levers will cause raising and lowering of said main arm and upstanding member between a low and a raised upwardly inclined position for normal loading operation and that, when said second tension member is locked in its retracted position, lowering of said lifting levers will cause said main arm to pivot into an inoperative upright position.

3. A loading attachment for a tractor having a pair of lifting levers at the back thereof and power means for raising and lowering said lifting levers, said attachment comprising a main arm having a transverse leg at the inner end thereof, the outer ends of said transverse leg being pivotally connected to said pair of lifting levers, a loading device mounted at the outer end of said main arm, an upstanding member consisting of an inverted V-shaped member having the lower ends of its legs pivotally connected to the outer ends of said transverse leg and having an apex portion, a link pivotally connected to the apex portion of said upstanding inverted V-shaped member and to said tractor at a point above the point of attachment of said lifting levers to said tractor, a first collapsible tension member connected to the apex portion of said upstanding member and to said main arm at a point adjacent the outer end of the latter, and a second tension member attached to said tractor and to said main arm at a point on said main arm intermediate the inner and outer ends of the latter, said second tension member being freely extensible between a retracted and an elongated position and incorporating means for locking said second tension member in its retracted position, so constructed and arranged that, when said second tension member is unlocked and is freely extensible, operation of said lifting levers will cause raising and lowering of said main arm and upstanding member between a low and a raised upwardly inclined position for normal loading operation and that, when said second tension member is locked in its retracted position, lowering of said lifting levers will cause said main arm to pivot into an inoperative upright position.

4. A loading attachment as claimed in claim 3, wherein said link is adjustable in length.

5. A loading attachment as claimed in claim 3, further including a latching member mounted on the apex portion of said upstanding member and engageable with said main arm to maintain the latter in inoperative upright position.

6. A loading attachment as claimed in claim 3, wherein said second tension member consists of two tubes in telescopic engagement, one of said tubes having a yoke-shaped extension pivotally connected on said one tube and pivotally connected to said main arm above said transverse leg, and spring means to urge said yoke-shaped extension in substantial alignment with said one tube.

7. A loading attachment as claimed in claim 6, wherein said locking means for locking said second tension member in retracted position comprises a handle integral with one of said tubes and providing a locking surface and a block projecting from the other tube and engageable by said locking surface, whereby turning of said handle will engage the locking surface thereof with the block on the other tube.

8. A loading attachment as claimed in claim 7, further including means for adjusting the overall length of the tube provided with said handle and locking surface.

9. A loading attachment for a tractor having a pair of lifting levers at the back thereof and power means for raising and lowering said lifting levers, said attachment comprising a main arm having a transverse leg at the inner end thereof, the outer ends of said transverse leg being pivotally mounted on the outer end of said main arm, means for latching said fork against pivotal movement with respect to said main arm, an upstanding member pivotally connected to said transverse leg, a link pivotally connected to the upper end of said upstanding member and to said tractor at a point above the points of attachment of said lifting levers to said tractor, a first collapsible tension member between said upstanding member and said main arm and a second tension member attached to said tractor and to said main arm at a point on said main arm intermediate the inner and outer ends of the latter, said second tension member being freely extensible between a retracted and an elongated position and incorporating means for locking said second tension member in its retracted position, so constructed and arranged that, when said second tension member is unlocked and is freely extensible, operation of said lifting levers will cause raising and lowering of said main arm and upstanding member between a low and a raised upwardly inclined position for normal loading operation and that, when said second tension member is locked in its retracted position, lowering of said lifting levers will cause said main arm to pivot into an inoperative upright position.

10. A loading attachment as claimed in claim 9, further including rope means accessible to the driver of the tractor and attached to the fork latching means and adapted for unlatching said fork.

11. A loading attachment as claimed in claim 9, further including a latching member mounted on the upper end of said upstanding member and engageable with said main arm to maintain said main arm in inoperative upright position and rope means accessible to the driver of the tractor and attached to the fork latching means for unlatching said fork and being also operative to unlatch said main arm from said upstanding member in the inoperative upright position of said main arm.

12. A loading attachment for a tractor having a pair of lifting levers at the back thereof and power means for raising and lowering said lifting levers, said attachment comprising a main arm having a transverse leg at the inner end thereof, the outer ends of said transverse leg being pivotally connected to said pair of lifting levers, a hitching device mounted on said transverse leg underneath said main arm for attachment of the draw bar of a vehicle to be pulled by the tractor, a fork pivotally mounted on the outer end of said main arm, means for latching said fork against pivotal movement with respect to said main arm, means accessible to the driver of the tractor for unlatching said fork, an upstanding member pivotally connected to said transverse leg at its lower end, a link pivotally connected to the upper end of said upstanding member and to said tractor at a point above the points of attachment of said lifting levers to said tractor, a first collapsible tension member between said upstanding member and said main arm and attached to said main arm at a point intermediate the inner and outer ends of said main arm, said second tension member being freely extensible between a retracted and an elongated position and incorporating means for locking said tension member in its retracted position, so constructed and arranged that, when said second tension member is unlocked and is freely extensible, operation of said lifting levers will cause raising and lowering of said main arm and upstanding member between a low and a raised upwardly inclined position for normal loading operation and that, when said second tension member is locked in its retracted position, lowering of said lifting levers will cause said main arm to pivot into an inoperative upright position.

13. A loading attachment for a tractor having a pair of lifting levers at the back thereof and power means for raising and lowering said lifting levers, said attachment comprising a main arm having a curved inner portion and a straight outer portion, a transverse leg integrally connected to the inner end of said main arm, the outer ends of said transverse leg being pivotally connected to said pair of lifting levers, a loading device mounted at the outer end of said main arm, an upstanding member pivotally connected to transverse leg at its lower end, a link pivotally connected to the upper end of said upstanding member and to said tractor at a point above the points of attachment of said lifting levers to said tractor, a first collapsible tension member between said upstanding member of said main arm, and a second tension member between said tractor and said main arm and attached to said main arm at a point intermediate the inner and outer ends of said main arm, said second tension member being freely extensible between a retracted and an elongated position and incorporating means for locking said tension member in its retracted position, so constructed and arranged that, when said second tension member is unlocked and is freely extensible, operation of said lifting levers will cause raising and lowering of said main arm and upstanding member between a low and a raised upwardly inclined position for normal loading operation and that, when said second tension member is locked in its retracted position, lowering of said lifting levers will cause said main arm to pivot into an inoperative upright position.

References Cited in the file of this patent

UNITED STATES PATENTS

| | | |
|---|---|---|
| 2,468,378 | Scofield | Apr. 26, 1949 |
| 2,791,340 | Haines et al. | May 7, 1957 |